United States Patent [19] [11] 3,977,302

Eickmann [45] Aug. 31, 1976

[54] FLUID MOTOR WITH RELEASABLE COUPLING

[76] Inventor: Karl Eickmann, Hayama, 2420 Isshiki, Kanagawa, Japan

[22] Filed: May 2, 1974

[21] Appl. No.: 466,245

[30] Foreign Application Priority Data

May 4, 1973 Austria .............................. 3966/73

[52] U.S. Cl. ..................................... 91/492; 74/661; 192/48.92; 244/17.23; 244/60

[51] Int. Cl.² .................... F01B 13/06; F16D 41/04; B64C 27/08; B64D 35/00

[58] Field of Search ................ 91/473, 492; 418/69; 74/661; 192/48.92

[56] References Cited

UNITED STATES PATENTS

| | | | |
|---|---|---|---|
| 973,064 | 10/1910 | Paul | 418/69 |
| 1,466,394 | 8/1923 | Fornaca | 74/661 |
| 2,163,080 | 6/1939 | Benedek | 91/492 |
| 2,212,490 | 8/1940 | Adler | 244/60 |
| 2,454,138 | 11/1948 | Delzer | 244/60 |
| 2,971,402 | 2/1961 | Lovercheck | 74/661 |
| 3,357,362 | 12/1967 | Orr | 91/492 |
| 3,690,097 | 9/1972 | Widmaier | 91/492 |

FOREIGN PATENTS OR APPLICATIONS

| | | | |
|---|---|---|---|
| 58,961 | 5/1913 | Austria | 244/17.11 |

*Primary Examiner*—John J. Vrablik
*Attorney, Agent, or Firm*—Michael J. Striker

[57] ABSTRACT

An annular rotor element is rotatably mounted in a housing and has a center opening in which a shaft element is journalled with annular clearance. An arrangement is provided for coupling the elements in motion-transmitting relationship in automatic response to relative rotation in one direction, and for uncoupling the elements in automatic response to relative rotation of the elements in an opposite direction.

6 Claims, 13 Drawing Figures

FLUID MOTOR WITH RELEASABLE COUPLING

BACKGROUND OF THE INVENTION

The present invention relates generally to a fluid motor construction, and more particularly to an improvement in a fluid motor construction which incorporates a safety arrangement.

It is already known from the prior art to provide fluid motors, including dual-motor constructions — especially of the radial-piston variety—wherein two fluid motors may be coupled with a common shaft with both motors either be connected in series in a common stream of pressure fluid, or being connected in parallel in a common stream or in parallel in two separate streams of pressure fluids. A fluid motor construction of the dual-motor variety, wherein the motors are arranged in axial parallelism, is already known from my prior U.S. Pat. No. 3,253,806. It is also shown in this patent that the two motors can be driven in mutually opposite directions.

The prior-art constructions of this type are quite satisfactory for many, if not most, applications. However, there are certain instances in which the prior-art constructions do not provide an adequate degree of safety, since they are not proof against failure and since there are applications — for instance in the aircraft industry—where such failure can result in loss of life and property.

To take just one example, if in a helicopter the rotors are driven by two coupled fluid motors, and if one of the fluid motors becomes defective for whatever reason, the remaining fluid motor cannot turn the drive shaft for the rotors and at the same time overcome the resistance of the defective motor, with the result that the craft will inevitably crash.

SUMMARY OF THE INVENTION

It is, accordingly, an object of the present invention to overcome the disadvantages of the prior art.

More particularly, it is an object of the present invention to provide an improved fluid motor construction wherein these disadvantages are avoided.

In keeping with the above objects, and with others which will become apparent hereafter, one feature of the invention resides in a fluid motor which, briefly stated, comprises a housing, an annular rotor element rotatably mounted in the housing and having a center opening, and a shaft element journalled in the housing and extending with annular clearance through the center opening of the rotor element. According to the invention, means are provided for coupling the elements in motion-transmitting relationship in automatic response to relative rotation of the elements in one direction and for uncoupling the elements in automatic response to relative rotation of the elements in an opposite direction. If, returning to the above example of the application of a dual-motor construction acting on a single output shaft for the rotors of a helicopter, one of the motors becomes defective, the continued rotation of the output shaft under the urging of the other still operative motor will effect relative rotation between the output shaft and the rotor of the defective motor in a sense resulting in automatic uncoupling of the output shaft from the rotor of the defective motor, so that the latter cannot prevent the still operative motor from driving the output shaft. It is advantageous in such an application if the two motors are connected in parallel in two separate fluid streams, so that one fluid stream can continue to drive the still operative motor when another one of the motors becomes defective.

Even if only a single motor is provided which drives the output shaft for the rotors of a helicopter, the fact that this single fluid motor might become defective will not ipso facto result in a crashing of the helicopter when the construction employs the present invention. The reason for this is that when the motor suddenly becomes defective and its rotor no longer turns, the output shaft will attempt to continue turning under the influence of inertia and this will be sufficient to provide relative rotation of the output shaft with the now stationary rotor of the defective motor, so that the output shaft becomes automatically uncoupled from the rotor. The output shaft can now turn freely, which means that the rotors of the helicopter, that is the airscrew blades thereof, will be in auto-rotational condition and will permit the helicopter to land, rather than crash, even though in unpowered flight and without any possibility of exercising control.

There are other circumstances in which the present invention is also applicable, since in other applications it was also at times observed that a fluid motor might seize and suddenly stop, causing an accident which is the reason why the fluid motors of the prior art were not suitable for driving the wheels of high-speed vehicles, for instance automotive vehicles. Here, again, the present invention overcomes the disadvantages of the prior art since if the single fluid motor becomes inoperative, it will become automatically uncoupled from the shaft which it has driven and permit the vehicle to coast to a stop, or if two or more fluid motors are provided and one of them becomes defective, it will become uncoupled from its associated shaft and will permit the remaining fluid motors to continue driving the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
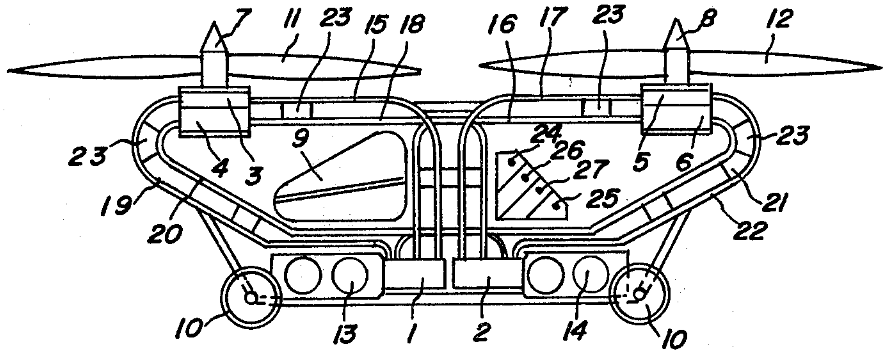
FIG. 1 is a somewhat diagrammatic longitudinal section illustrating a self-propelled vehicle embodying the invention.

Referring firstly to FIG. 1 it will be seen that this Figure illustrates a self-propelled vehicle which can operate both as a helicopter and as a land-borne vehicle. Reference numerals 13 and 14 identify drives of any known and suitable types, which drive double-stream pumps 1 and 2, that is fluid pumps of which each produces two streams of fluid. Pressure fluid conduits 15, 16, 17 and 18 lead from these pumps 1 and 2 to two sets of fluid motors, each set being composed of the fluid motors 3 and 4 or 5 and 6, respectively. The fluid passes through these motors, driving the same, and is returned via the conduits 19, 20, 21 and 22 to the pumps 1 and 2, respectively. Each set of motors 3, 4 and 5, 6 drives in rotation one of the shafts 7 and 8, respectively. Each of the shafts 7 and 8 carries driven components, in this case rotor blades 11 and 12, respectively. Reference numeral 9 identifies the driver and/or passenger cabin of the vehicle, and reference numerals 10 and 24–27 identifying various auxiliary components, such as wheels, fuel tanks, oil tanks and the like, which have been illustrated for the sake of completeness.

Each of the pumps 1 and 2 has one fluid conduit extend to one of the motors 3 or 4 and another fluid conduit extend to the motors 5 or 6. Assuming, under these circumstances, that one of the pumps 1 or 2 or one of the drives 13 or 14 should become defective, then the other pump 2 or 1 or the drive 14 or 13 will still be sufficient to drive both of the shafts 7 and 8 and therefore both sets of rotor blades 11 and 12.

On the other hand, if one of the dual motors 3, 4 should become defective, or one of the dual motors 5, 6, then the shaft driven by the particular set of motors, that is either the shaft 7 or the shaft 8, will become automatically uncoupled from the defective motor but will continue to be driven by the still operative motor of the pair.

It is clear that the construction illustrated in FIG. 1 will assure under alll circumstances that the rotors 11 and 12 will continue to operate if one of the motors of each set of dual motors should become defective, if one of the pumps should become defective or if one of the drives should become defective. The advantages in terms of increased safety are immediately apparent, irrespective of whether at the time the defect occurs the vehicle of FIG. 1 is used as a helicopter or as a land-borne vehicle which might be travelling at high speed on its wheels 10.

Figure 2:
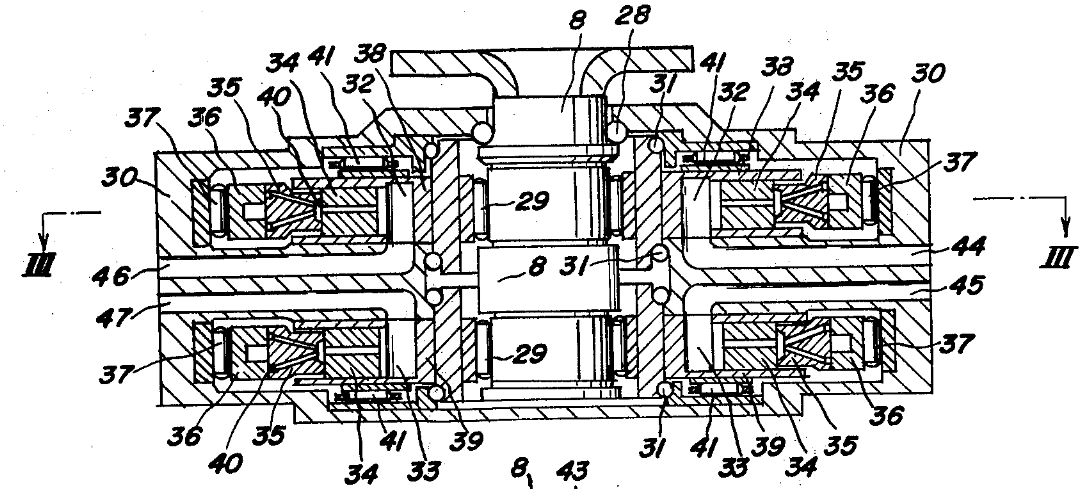
FIG. 2 is an axial section through an embodiment of the invention such as used in FIG. 1.
Figure 3:
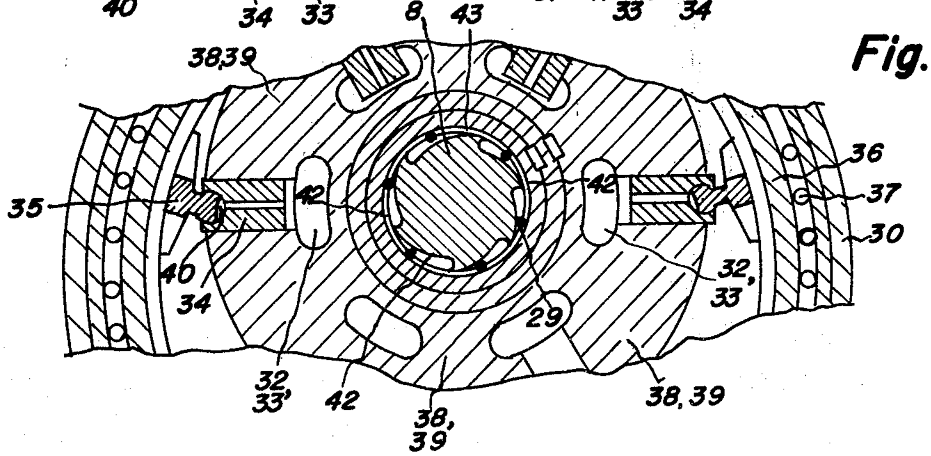
FIG. 3 is a fragmentary section taken on line III—III of FIG. 2.

FIGS. 2 and 3 show on an enlarged scale and in section one of the sets of dual motors, here the motors 5 and 6. Reference numeral 30 identifies the housing in which the two fluid motors 5 and 6 are mounted. The fluid motors 5 and 6 are themselves of conventional construction known from the prior art and have two rotors 38 and 39, respectively, which have the working chambers 32 and 33. The rotors 38 and 39 of course are journalled for rotation, for which purpose the bearings 31 are provided. The working chambers 32 and 33 are associated with displacement elements, such as pistons 34, which are supported via their piston shoes 35 on control rings 36 which are slidingly engaged by piston shoes 35. Due to the eccentricity between the rotors 38 and 39 and the control rings 36, which is known from the art, the rotors are compelled to rotate when their working chambers 32, 33 receive fluid under pressure through the conduits 46 or 47, or 44 or 45, which in turn of course receive fluid from the pumps 1 or 2 in the manner described with respect of FIG. 1. The control rings 36 may rotate in bearings 37, and the rotors 38 and 39 can be retained at their respective axial ends by the bearings 41. Hydrostatic bearings 40 may be provided between the pistons 34 and the piston shoes 35 in known manner.

The construction thus far described is known from the prior art, except that two known prior-art radial piston motors have been combined to form a dual-motor unit.

In this embodiment, however, the fluid supply is separate for each of the motors, an each rotor is provided with one of the bearings 41. The fluid supplies 44, 46 are associated with one of the rotors and the fluid supplies 45, 47 are associated with the other rotor. This means that each rotor can be supplied with fluid independently of the other and that both of the rotors 38, 39 can rotate and be driven independently of one another.

More importantly, however, and also in accordance with the present invention, free-wheeling devices are provided between the shaft 8 which extends through the center opening of the respective rotors 38 and 39, and each of these rotors. These devices use the outer circumferential surface 42 of the shaft 8, the inner circumferential surfaces 43 bounding the center openings of the respective rotors, and the rolling elements (spherical or cylindrical) 29. It will be seen that the outer circumferential surface 42 of the shaft 8 is formed within the confines of the center opening of the respective rotor (see FIG. 3 where only one rotor is shown) with a plurality of angularly spaced recesses which all taper in circumferential direction of the shaft 8 from a greatest to a least depth, the taper being in one and the same circumferential direction for all of these recesses. One of the rolling bodies 29 is located in each of the recesses, as shown particularly in FIG. 3.

If pressure fluid is supplied to the two rotors 38 and 39, then they will both rotate, for instance in clockwise direction in FIG. 3. The circumferentially moving surface 43 takes along the rolling bodies 29 toward the narrow ends of the recesses, squeezing the rolling bodies against the surface 42 and thus providing for an automatic coupling of the shaft 8 with the rotors 38 and 39 in motion-transmitting relationship. The two rotors 38 and 39 then jointly drive the shaft 8 in rotation, so that the latter in turn can act upon the user with which it is connected, for instance the rotor blades 11 and 12 of FIG. 1.

However, this automatic coupling takes place only when there is relative rotation of the shaft 8 and the rotors 38 and 39 in one circumferential direction. If there is relative rotation in the opposite circumferential direction, there will be an automatic uncoupling of the shaft 8 from the respective rotor 38 or 39. Assuming that one of the rotors 38 or 39 comes to a stop, for instance due to breakage, a lack of fluid supply or the like, then the shaft 8 of course continues to rotate because it continues to be driven by that rotor which is not defective. This continued rotation of the shaft 8 with reference to stationary rotor 38 or 39 causes the rolling bodies 39 of the stationary rotor to roll towards the deepest portions of the respective recesses in which they are accommodated, with the result that the stationary rotor is now completely uncoupled from the shaft 8 which continues to be driven by the still operative rotor. The possibility that the stationary rotor might suddenly brake the shaft 8 to a stop, and thus cause an accident — for instance by preventing further rotation of the rotor blades 11 or 12 — is thereby completely eliminated.

It will be appreciated that the invention is equally applicable if only a single motor is provided, that is if only one of the rotors 38 or 39 were provided and coupled with the shaft 8 (or analogously with the shaft 7). In that case, the shaft 7 or 8 would no longer be driven when the rotor comes to a stop, but under the influence of its inertia it would continue to turn relative to the defective and hence stationary single rotor, to become automatically uncoupled therefrom, so that it could then turn freely, for instance due to the autorotation of the rotor blades 11 or 12.

On the other hand, if a dual-motor construction is utilized such as shown in FIGS. 2 and 3, then it can also be modified to provide only one of the rotors 38 or 39 with the free wheeling arrangement according to the present invention, and to fixedly connect the other rotor with the shaft. This would merely require eliminating — for the rotor which is to be fixedly coupled with the shaft 8— the rolling bodies 29 and perhaps the recess formed in the surface 42, and instead to provide keys or splines which connect the rotor with the shaft 8. If such a construction is chosen, then the user has the freedom of employing only the fixedly connected rotor to drive the shaft 8 if and when this is desired, whereas the second rotor at these times is disconnected from the shaft 8 and exerts no drag upon the same. If, on the other hand, the power of the second rotor is required in addition to that of the fixedly connected rotor, for instance if a high torque is needed, then the heretofore uncoupled rotor can be readily coupled with the shaft 8 and its power added to that of the fixedly connected rotor. The latter, incidentally, can serve to drive the shaft 8 in both directions to thereby establish coupling or uncoupling of the second rotor if and when desired.

It will be appreciated that if the vehicle shown in FIG. 1 is to be used as a land-borne vehicle, then the shafts 7 and 8 will be uncoupled from the rotor blades 11 and 12 and will be coupled in suitable manner with the wheels 10 to drive the latter. Assuming that high torque is required, for instance for driving over rough terrain, then pressure fluid is admitted into both of the rotors 38 and 39 so that the two of them act together and produce high torque. If, on the other hand, the vehicle is to operate on a road and is to move quickly, where less torque is required, then all pressure fluid that was previously supplied to the two rotors 38 and 39 can be supplied to a single rotor 38 or the rotor 39, while the respectively other rotor is uncoupled from the shaft 8. On the other hand, if the consturction is used in which only one of the rotors is provided with the free wheeling arrangement and the other is fixedly connected, then of course the entire fluid supply will be channeled to the rotors which is fixedly connected with the shaft. In any case, since only a single rotor will then receive all the fluid that was previously supplied to the two rotors, it will operate correspondingly faster.

Figure 4:
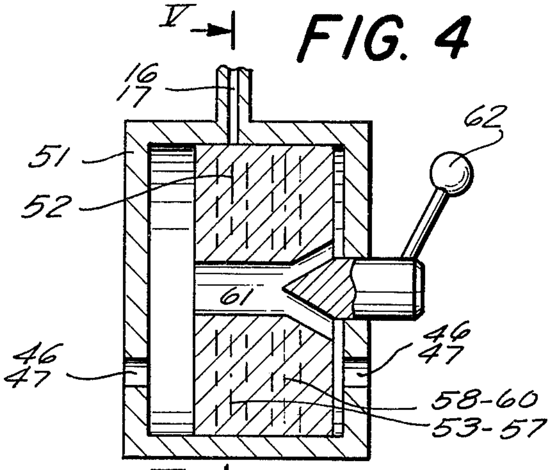
FIGS. 4–13 show a control valve in various different control positions in sectional views.
Figure 11:
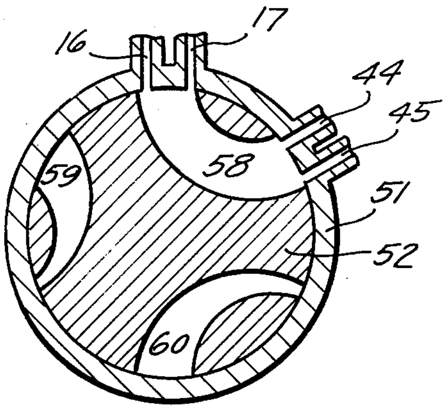
Figure 12:
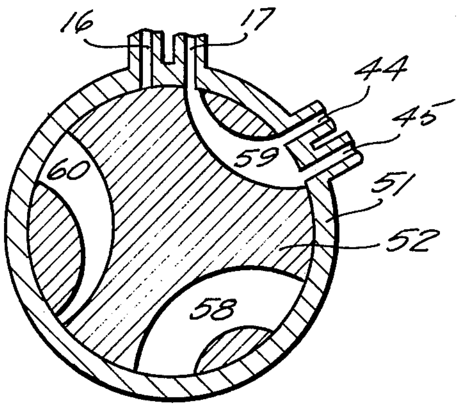
Figure 13:
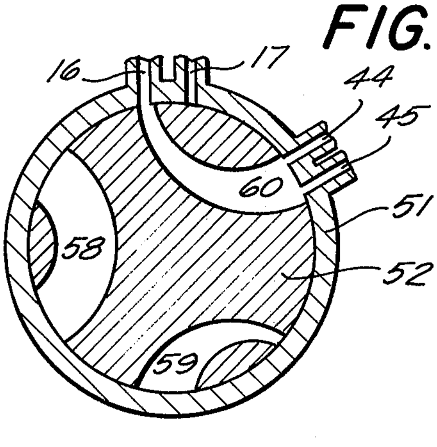

In FIGS. 4 to 13 a valve is shown by way of example which may be connected to the motor of the invention. Other suitable valves may also be used. FIG. 4 demonstrates that the rotary valve body 52 can be axially moved in the housing 51 into two positions. In case of rear position, control passages 58 to 60 are aligned in the plane 58–60 with the valve ports 16, 17 and 44, 45. By operating means 62 the valve body can be axially moved from one position into the other and it can be turned through any degrees. In the axial front position control passages 53 to 57 are aligned in the plane 53–57 with the ports 16, 17 and 44, 45. FIGS. 5 to 10 show the valve body in front position, while FIGS. 11 to 13 show the valve body in rear position. Said Figures are cross sections through FIG. 4 along line V—V.

Figure 5:
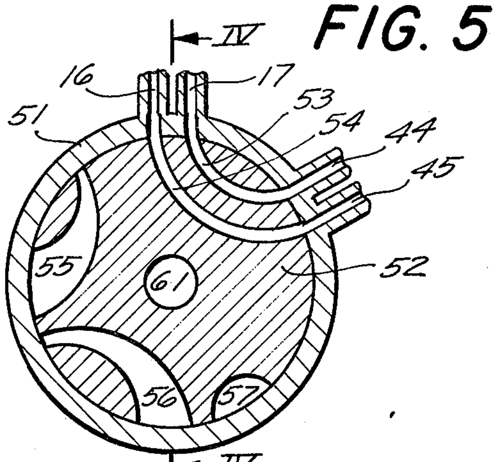

FIG. 5 is the standard position of 0° turn, and in this position fluid line 16 is connected to motor entrance 45, while fluid line 17 is connected to motor entrance 44 via passages 53 and 54.

Figure 6:
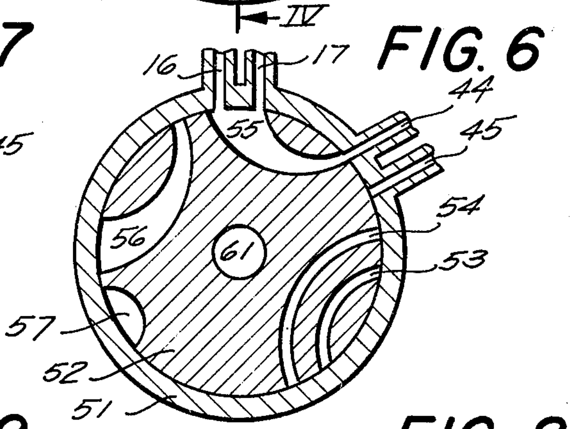

In FIG. 6 the valve body 52 is turned 90°, whereby passage 55 connects both fluid lines 16 and 17 to motor entrance 44, thereby causing the motor to revolve with double speed, because only one of the rotors of the motor now receives the entire fluid from both flows.

Figure 7:
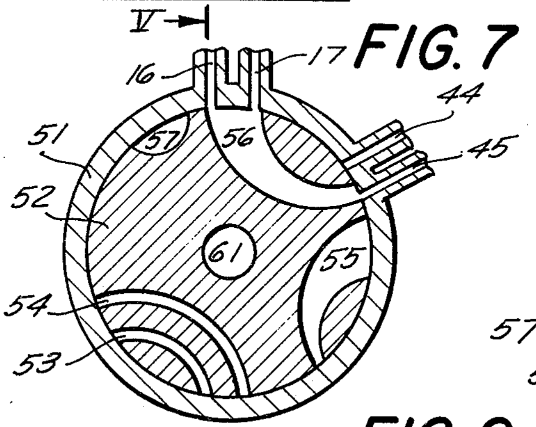

In FIG. 7 the valve is turned 180°, whereby both supply flows 16 and 17 are communicated to the other motor entrance 45 by passage 56. The motor is now driven with double speed by the other of the rotors.

Figure 8:
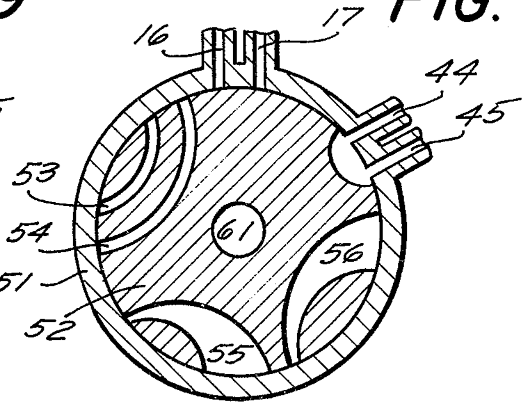

In FIG. 8 the valve body 52 is turned 270°, whereat the motor entrances 44 and 45 are communicated by passage 57 while the entrances from the fluid lines 16, 17 are blocked.

Figure 9:
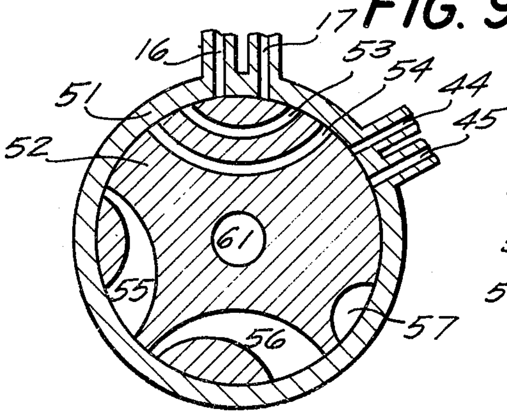

In FIG. 9 the valve body 52 is turned 330° with the result that all valve entrances and exits are blocked and thereby pumps and motor are blocked likewise.

Figure 10:
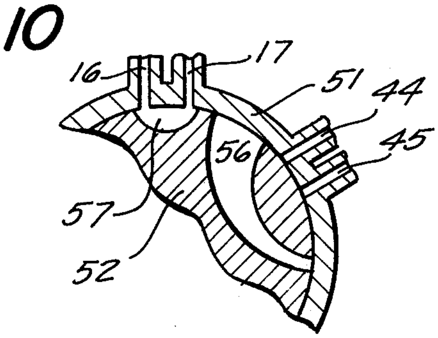

In FIG. 10 the valve body is turned 210°, whereby passage 57 communicates entrances 16 and 17 and thereby pump supply lines 16 and 17, while the motor entrances 44 and 45 are blocked.

In FIG. 11 the valve body is in rear position and at 0° turn. Passage 58 communicates all connections, namely 16, 17 and 44 and 45 with one another. The separation of the flows is thereby eliminated and both fluid flows are combined and communicated, allow free flow exchange from one flow into the other and vice versa.

In FIG. 12 the valve body 52 is turned 120°, whereby the single fluid line 17 is communicated via passage 59 to both motor entrances 44 and 45, whereby the motor is caused to revolve with half rotary velocity.

In FIG. 13 the valve body 52 is turned 240°, whereby passage 60 communicates the other fluid supply line 16 with both motor entrances 44 and 45. Again, the motor is thereby caused to revolve with half of the usual rotary velocity.

Thus, the valve provides any possible communication, separation of flows or combination of flows and any desired blocking.

If this valve is interposed between fluid lines 16 and 17 of both fluid flow supply devices of FIG. 1, and both motor entrances 44 and 45 of FIGS. 2 and 3, then three different rotary speed ranges are obtainable: a low speed range, a medial speed range and a high speed range of the motor of this invention. In addition, if one of the fluid supply lines fails, it can be shut off by the valve. And, if one of the rotors of the motor is defective, it can be shut off by the valve. The still healthy or operative means can than be still used and operated, when one or more of the other means are shut off.

It is clear that the present invention provides a significant improvement in the safety of operation of equipment using fluid motors, and that it also affords a saving in energy since when only a single rotor is required for power supply, the second rotor can be disconnected whereas according to the prior art it always had to be driven also and thus wasted energy.

It will be understood that each of the elements described above, or two or more together, may also find a useful application in other types of constructions differing from the types described above.

While the invention has been illustrated and described as embodied in a fluid motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hydraulic radial-piston fluid motor, comprising a housing; two axially aligned annular rotor elements independently rotatably mounted in said housing and each having a central axial opening and radial cylinder bores; reciprocable pistons located in said cylinder bores; first passage means for supplying fluid to and removing it from the cylinder bores of one of said rotor elements; second passage means separate from said first means for suppling fluid to and removing it from the cylinder bores of the other of said rotor elements; a shaft element journalled in said housing and extending with annular clearance through said center openings; and first and second coupling means each associated with one of said rotor elements for individually coupling the respective rotor element with said shaft element in motion-transmitting relationship in automatic response to relative rotation of the respective rotor element and said shaft element in one direction and for uncoupling in automatic response to said relative rotation in an opposite direction.

2. A motor as defined in claim 1, wherein said means comprises an inner circumferential surface of the respective rotor element bounding said center thereof, and outer circumferential surface of said shaft element defining within said inner circumferential surface said annular clearance, and a plurality of rolling bodies between said surfaces.

3. A motor as defined in claim 1, wherein each of said passage means includes supply means for hydraulic fluid; and further comprising means for selectively interrupting the communication of one of said elements with said supply means.

4. A motor as defined in claim 1, wherein each of said passage means communicates with a separate source of hydraulic fluid; and further comprising means for selectively interrupting the communication of one of said elements with the associated source of fluid.

5. A motor as defined in claim 1; and further comprising airscrew means operatively associated with said shaft element so as to be driven by the same.

6. A motor as defined in claim 1; and further comprising propulsion-producing means operative associated with said shaft element so as to be driven by the same.

* * * * *